United States Patent Office 3,542,824
Patented Nov. 24, 1970

3,542,824
PERFLUOROCARBOXYLIC ACID ESTER OF TRICYCLOHEXYLTIN HYDROXIDE
Donald E. Bublitz, Concord, Calif., assignor to The Dow Chemical Company, Midland, Mich., a corporation of Delaware
No Drawing. Filed July 31, 1968, Ser. No. 748,948
Int. Cl. C07f 7/22
U.S. Cl. 260—429.7     8 Claims

ABSTRACT OF THE DISCLOSURE

Complete esters of perfluorocarboxylic acids and tricyclohexyltin hydroxide wherein the perfluorocarboxylic acids are perfluoro,lower)alkanoic acids, pentafluorobenzoic acid, perfluoro(lower)alkanedioic acids, or tetrafluoroterephthalic acid are disclosed. These compounds are useful as pesticides.

---

The present invention relates to novel and useful complete esters of perfluorocarboxylic acids and tricyclohexyltin hydroxide wherein the perfluorocarboxylic acids are perfluoro(lower)alkanoic acids, pentafluorobenzoic acid, perfluoro(lower)alkanedioic acids, or tetrafluoroterephthalic acid. These compounds are represented by the following Formulas I and II:

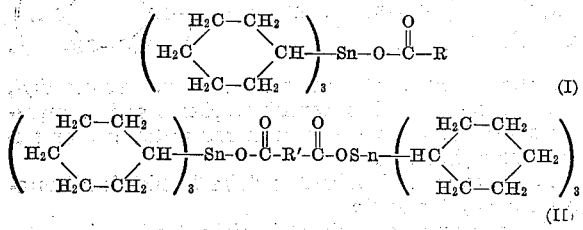

In these and succeeding formulas, R represents trifluoromethyl, pentafluoroethyl, heptafluoro-n-propyl, or pentafluorophenyl, and R' represents tetrafluoroethylene, hexafluorotrimethylene, or tetrafluoro-p-phenylene.

Wherever employed in the present specification and claims, the prefix "per" denotes the presence of the maximum number of fluorine atoms which can be attached to the respective carbon atoms as replacements for hydrogen atoms. By definition the perfluoro(lower)alkanoic acids hereof are trifluoroacetic, pentafluoro-n-propionic, and heptafluoro-n-butyric acids and the perfluoro(lower) alkanedioic acids hereof are tetrafluorosuccinic and hexafluoroglutaric acids.

The products of the present invention are crystalline solids at room temperature. They are useful as pesticides for the control of a wide variety of insect, arachnid, fungal and plant pests; for example, mosquitoes, flies, spiders, mites, ticks, the causative agents of apple scab and potato late blight, pigweeds, milfoil and foxtail. They are particularly useful as acaricides for the control of mites and ticks.

The compounds of the present invention are prepared by reacting together tricyclohexyltin hydride and a perfluorocarboxylic acid selected from trifluoroacetic, pentafluoropropionic, heptafluoro - n - butyric, pentafluorobenzoic, tetrafluorosuccinic, hexafluoroglutaric and tetrafluoroterephthalic acids. The reaction proceeds substantially exothermically and can be regulated in velocity by monitoring the rate of contacting the reactants or by external cooling or heating, as required. Generally, the temperature of the reaction ranges from slightly more than room temperature up to about 100° C. or more.

In the contacting and reacting of tricyclohexyltin hydride with a perfluoromonocarboxylic acid to prepare the products of Formula I, the reaction consumes the two reactants in a mole ratio of 1:1. In the preparation of the products of Formula II, two moles of tricyclohexyltin hydride are consumed per mole of perfluorodicarboxylic acid starting compound. Thus, although some of the desired product is prepared by contacting the respective reactants in any molecular proportion, it is preferred to employ the requisite molecular amounts of each.

In carrying out the reaction, the tricyclohexyltin hydride and perfluorocarboxylic acid are contacted with one another in any convenient order and manner. An inert, liquid reaction medium can be employed, if desired. Suitable media include toluene, hexane, and the like. In a preferred procedure, the perfluorocarboxylic acid reactant is added to the tricyclohexyltin hydride. The ensuing reaction is allowed to proceed exothermically by regulating the reactant contact rate or time or by external cooling or heating so as to provide a reaction temperature ranging up to about 100° C. or more. The extent of reaction can be monitored by the evolution of hydrogen, it being substantially complete when such evolution is no longer apparent. Upon completion of the reaction, the reaction mixture is conventionally processed to recover and purify, if desired, the product. Such include filtration, decantation, recrystallization and chromatography.

The following examples illustrate the present invention but are not to be construed as limiting.

EXAMPLE 1

Trifluoroacetoxytricyclohexyltin

Trifluoroacetic acid (2.3 grams; 0.020 mole) is added dropwise with stirring and at room temperature to 7.4 grams (0.020 mole) of tricyclohexyltin hydride over a period of 1–2 minutes. An exothermic reaction occurs with the simultaneous evolution of hydrogen. The exothermic reaction is allowed to proceed unchecked for 1–2 hours or at least until the hydrogen evolution is substantially complete. The resultant mass is then cooled and recrystallized from hexane to obtain the trifluoroacetoxytricyclohexyltin product as a crystalline solid melting at 115°–118° C.

EXAMPLE 2

Heptafluorobutyryloxytricyclohexyltin

Heptafluorobutyric acid (2.46 grams; 0.02 mole) is added dropwise with stirring and at room temperature to 7.4 grams (0.020 mole) of tricyclohexyltin hydride over a period of 1–2 minutes. The resulting exothermic reaction with simultaneous evolution of hydrogen is allowed to continue for 0.5 hour at room temperature without the need for cooling or heating. Thereafter, the resultant mass is maintained at 90° C. on a steam bath for 1 hour to ensure completion of the reaction. The mass is then cooled and recrystallized from hexane to give the heptafluorobutyryloxytricyclohexyltin product as a crystalline solid melting at from 102°–105° C.

EXAMPLE 3

Pentafluorobenzoyloxytricyclohexyltin

A mixture of 3.69 grams (0.01 mole) of tricyclohexyltin hydride and 2.1 grams (0.01 mole) pentafluorobenzoic acid are mixed together with stirring over a 2–10 minute period. The mixture is then heated at 100° C. for 20–30 minutes. The reaction mass is then cooled and recrystallized from hexane to obtain the pentafluorobenzoyloxytricyclohexyltin product as a white solid melting at from 93°–95° C.

EXAMPLE 4

Tetrafluorosuccinyldioxy-bis-(tricyclohexyltin)

Tetrafluorosuccinic acid (1.90 grams; 0.0100 mole) and 7.4 grams (0.020 mole) of tricyclohexyltin hydride are mixed together at room temperature. The mixing is accomplished with stirring in about 2–5 minutes. The mixture is then heated for 2 hours on a steam bath. During the first 5 to 10 minutes of this heating period, a vigorous evolution of hydrogen occurs. The resultant reaction mass is cooled, pulverized, and suspended in a small amount of hexane. The suspension is filtered and the collected solid dried to obtain the tetrafluorosuccinyldioxy-bis-(tricyclohexyltin) product as a white powder melting at from 235°–238° C.

In procedures analogous to the foregoing and in accordance with the method of the present invention, the following are prepared.

Pentafluoropropionyloxytricyclohexyltin (molecular weight 531.2) by reacting together tricyclohexyltin hydride and pentafluoropropionic acid.

Hexafluoroglutaryldioxy - bis - (tricyclohexyltin) (molecular weight 974.3) by reacting together tricyclohexyltin hydride and hexafluoroglutaric acid.

Tetrafluoroterephthaloyldioxy - bis - (tricyclohexyltin) (molecular weight 972.3) by reacting together tricyclohexyltin hydride and tetrafluoroterephthalic acid.

The compounds of the present invention are useful as pesticides for the control of a wide variety of household and agricultural insect, arachnid, fungal, and plant pests such as mites, ticks, beetles, worms, flies, *Bacillus subtilis*, bread mold fungus, pigweeds, Moneywort, and Daphnia. For such use, the unmodified compounds can be employed. Alternatively, the compounds can be dispersed on an inert finely divided solid to prepare dust compositions. The latter dust compositions can be dispersed in water with or without the aid of a wetting agent and the resulting aqueous dispersions employed as sprays. In other procedures, the compounds can be employed as a constituent in edible oils or in other oils or solvents, or as a constituent in solvent-in-water or water-in-solvent emulsions or dispersions which can be employed as sprays, drenches or washes. Good results are obtained with methods employing and compositions containing pesticidal amounts of one or more of the compounds hereof. Generally, these amounts range from about 0.5 to about 5000 parts per million of one or more of the compounds.

In representative operations, each of trifluoroacetoxytricyclohexyltin, heptafluorobutyryloxytricyclohexyltin, pentafluorobenzoyloxytricyclohexyltin, and tetrafluorosuccinyldioxy-bis-(tricyclohexyltin), give 100 percent controls and kills of two-spotted spider mites when such are separately contacted with aqueous solutions containing one of the named compounds, as the sole toxicant, at a concentration of 25 parts per million by weight.

In further operations, each of trifluoroacetoxytricyclohexyltin, heptafluorobutyryloxytricyclohexyltin, pentafluorobenzoyloxytricyclohexyltin, and tetrafluorosuccinyldioxy-bis-(tricyclohexyltin) gives 100 percent controls and skills of each of yellow fever mosquitoes and Southern armyworms, when each of such are separately contacted with aqueous solutions containing one of the named compounds, as the sole toxicant, at a concentration of 100 parts per million parts by weight.

In additional operations, tetrafluorosuccinyldioxy-bis-(tricyclohexyltin) gives substantially complete controls and kills of the aquatic plant specie Elodea when the named compound is dispersed in the water environment of the named plant species at a concentration of 10 parts per million by weight.

In still additional operations, each of tetrafluorosuccinyldioxy-bis-(tricyclohexyltin) and pentafluorobenzoyloxytricyclohexyltin gives a 100 percent control and kill of each of *Aspergillus terreus*, *Trichophyton mentagrophytes*, *Bacillus subtilis*, *Pullularia pullulans*, and *Mycobacterium phlei* when such organisms are each separately contacted with compositions containing one of the named compounds at a concentration of 500 parts per million by weight.

The acids employed in the preparation of the compounds of the present invention are known and can be prepared in conventional methods. Tricyclohexyltin hydride can be prepared by reducing tricyclohexyltin chloride with lithium aluminum hydride preferably in organic reaction medium and at temperatures of from about −10° to 110° C.

What is claimed is:

1. The compound corresponding to one of the formulas

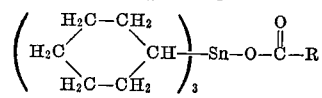

and

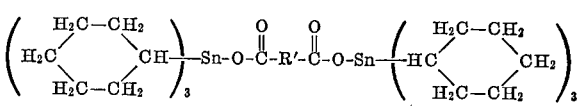

wherein R represents trifluoromethyl, pentafluoroethyl, heptafluoro-n-propyl or pentafluorophenyl and R' represents tetrafluoroethylene, hexafluorotrimethylene, or tetrafluoro-p-phenylene.

2. The compound claimed in claim 1 which is trifluoroacetoxytricyclohexyltin.

3. The compound claimed in claim 1 which is pentafluoropropionytricyclohexyltin.

4. The compound claimed in claim 1 which is heptafluoro-n-butyryloxytricyclohexyltin.

5. The compound claimed in claim 1 which is pentafluorobenzoyloxytricyclohexyltin.

6. The compound claimed in claim 1 which is tetrafluorosuccinyldioxy-bis-(tricyclohexyltin).

7. The compound claimed in claim 1 which is hexafluoroglutrayldioxy-bis-(tricyclohexyltin).

8. The compound claimed in claim 1 which is tetrafluoroterephthaloyldioxy-bis-(tricyclohexyltin).

References Cited

UNITED STATES PATENTS 3,382,264   5/1968   Leebrick _____ 260—429.7
3,423,443   1/1969   Blöchl _____ 260—429.7

HELEN M. McCARTHY, Primary Examiner

W. F. W. BELLAMY, Assistant Examiner

U.S. Cl. X.R.

424—288